United States Patent [19]

Miki et al.

[11] 4,268,903
[45] May 19, 1981

[54] STACK CONTROL SYSTEM AND METHOD FOR DATA PROCESSOR

[75] Inventors: Yusaku Miki, Fuchu; Hidemi Yamamoto, Kunitachi; Yuichi Kimihira, Urawa; Akio Tanaka, Yokohama, all of Japan

[73] Assignee: Tokyo Shibaura Denki Kabusiki Kaisha, Japan

[21] Appl. No.: 964,089

[22] Filed: Nov. 27, 1978

[30] Foreign Application Priority Data

Nov. 28, 1977 [JP] Japan .................. 52-141515

[51] Int. Cl.³ .......................................... G06F 13/06
[52] U.S. Cl. .................................................. 364/200
[58] Field of Search ... 364/200 MS File, 900 MS File

[56] References Cited

U.S. PATENT DOCUMENTS

| 3,868,644 | 2/1975 | Healey et al. | 364/200 |
| 3,938,098 | 2/1976 | Garlic | 364/200 |
| 4,041,462 | 8/1977 | Davis et al. | 364/200 |
| 4,104,721 | 8/1978 | Markstein et al. | 364/200 |

OTHER PUBLICATIONS

"Programming Techniques", P.D.P.-11/40, Processor Handbook, Digital Equipment Corp., 1972, Chapter 5, pp. 5-1 to 5-5.

Primary Examiner—Gareth D. Shaw
Assistant Examiner—Thomas M. Heckler
Attorney, Agent, or Firm—Finnegan, Henderson, Farabow, Garrett & Dunner

[57] ABSTRACT

A data processor having a stack area with a desirable variable size formed on a desirable area of a main memory unit in accordance with a direction by a user program, is provided with a stack control register group for controlling the stack area. A stack upper address register in the stack control register group holds the upper address specified on the stack area. The stack lower address register holds the lower limit address specified. A control stack pointer register holds the start address of a control stack area formed on the stack area for storing the number of a register specified by a user program and the contents thereof. A data stack pointer register holds the start address of the data stack area which is formed on said stack area and used by the user program.

18 Claims, 14 Drawing Figures

F I G. 1

FIG. 3A SAVE G1,G2,B1,B2,F1,F2

FIG. 3B RTN G

FIG. 3C GSK B1, K(X)

FIG. 3D RSK 0, K(X)

FIG. 3E GSCR G1,N

FIG. 3F SFRG 3,D2(X2)

FIG. 3G SFRG 11,D2(X2)

STACK CONTROL SYSTEM AND METHOD FOR DATA PROCESSOR

BACKGROUND OF THE INVENTION

1. Field of the Invention

The invention relates to a data processor and, more particularly, to a control system and method for controlling a memory stack.

2. Background of the Invention

By convention, not many minicomputer systems are provided with a stack structure (hardware) and the stack structure provided is insufficient in its performance. The stack is generally categorized into a control stack to save or restore the return addresses of subroutines, for example, and a data stack to save or restore data as a result of calculation, for example. A minicomputer employing such a stack is disclosed in an article "PROGRAMMING TECHNIQUES", Chapter 5, pp. 5—1 to 5—5 of "PDP—11/40 Processor Handbook" published by Digital Equipment Corporation in 1972. The stack is so designed as to exclusively store working data only, not control data. As in this case, most of the conventional stacks are designed so as to operate solely as a control stack or as a data stack, but not as a stack with both the functions.

Some medium- or large-size computer systems are provided with a stack having both the functions. When such a stack structure is applied to a minicomputer, however, the cost of the computer rises to impair one of the merits of the minicomputer, that is, a low cost.

It is for this reason that the conventional minicomputer has employed a software stack in place of a hardward stack. More specifically, a stack area is formed in a memory area. The operating system performs the save and restore operation for various register data which occur during program branching operations and the obtainment and release operation of the work area which occurs in the processing of various data through a program. For this reason, the data processing is complicated and hence the data processing speed is slow and the overhead of the software system is large.

SUMMARY OF THE INVENTION

Accordingly, an object of the invention is to provide a data processor with a stack structure (hardware) effectively performing the save/restore operation for various registers during program branching and the obtainment/release operation for the working area in the various data processing steps associated with execution of a program. The data processor according to the invention operates at high speed and with a reduced overhead of software.

To achieve the above object, there is provided a data processor having a main memory unit for storing data and program, an arithmetic/logic unit for performing arithmetic and logic operations, a group of registers for performing arithmetic and logic operations as well as other operations, and a read only memory for storing microprograms to control those units in the course of the execution of the program stored in the main memory, the processor being characterized by a stack control means operating in accordance with a method for controlling a stack provide a desirable stack size formed at a desirable location within a memory area of the main memory unit and providing areas for storage of both program data and working data.

Other objects and features of the invention will be apparent from the following description taken in connection with the accompanying drawings, in which:

DETAILED DESCRIPTION OF THE PREFERRED EMBODIMENT

Figure 1:
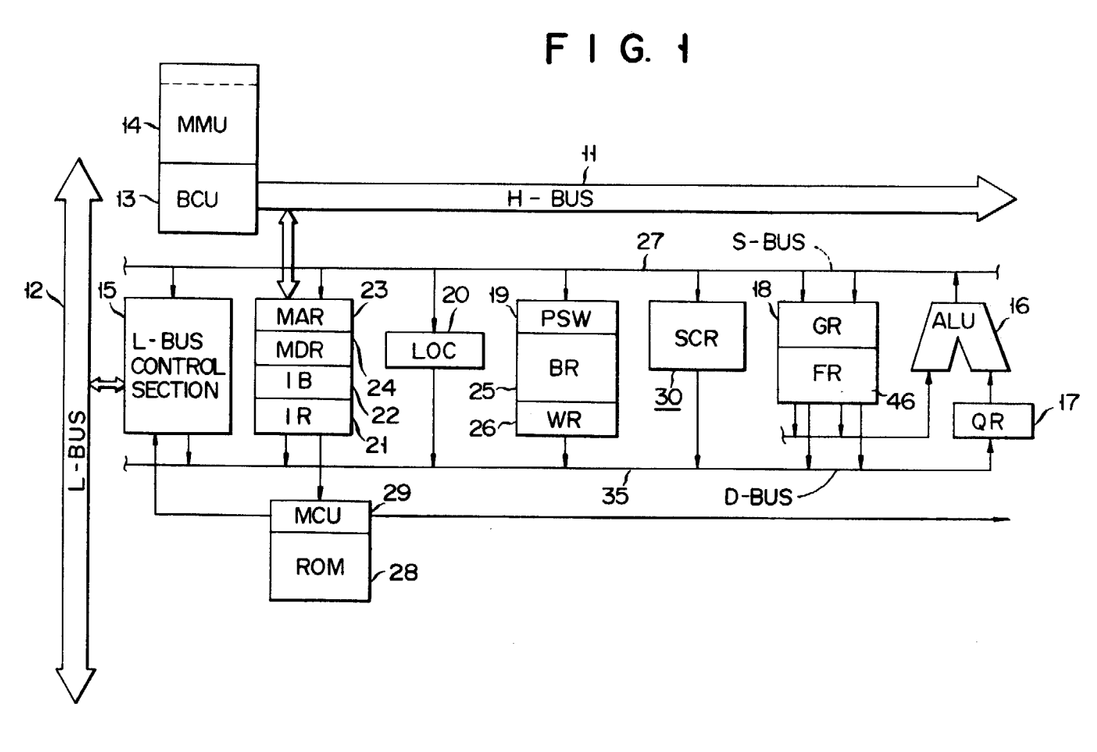
FIG. 1 shows a block diagram of an embodiment of a data processor according to the invention.

Data Processor (FIG. 1)

The overall system of the data processor embodying the invention will first be given with reference to FIG. 1.

As shown, a high speed bus (H-bus) 11 and a low speed bus (L-bus) 12 are used in the data processor of this example.

The H-bus 11 has a data width of 32 bits and allows parallel data transfer therethrough at a high speed. The H-bus 11 leads through a bus control unit (BCU) 13 to a main memory unit (MMU) 14, various registers (not shown) and a data bus (not shown). Channels (not shown ) for an input/output unit (mainly a file unit) such as a high speed input/output multiplexer or DMA are also coupled with the H-bus 11, while being under control of BCU 13.

The L-bus 12, which is provided separately from the H-bus 11, is a bidirectional bus with a data width of 8 to 16 bits, for example, permitting parallel data transfer as a relatively low speed to and from various input/output units under control of an L-bus control section 15. Through the L-bus 12 leading to the input/output units is performed multiplex input/output control by a high speed input/output multiplexer (not shown) externally connected to the H-bus 11.

The main memory unit (MMU) 14 stores various programs and data. A stack area is assigned to a specified memory area of MMU 14.

Between a source bus (S-bus) 27 and a destination bus (D-bus) 35 are inserted various kinds of circuit blocks, as shown. An arithmetic logic unit (ALU) 16, which is one of such circuit blocks, executes arithmetic and logical operations on various data. A quotient register (QR) 17 temporarily holds the result of the operation by ALU 16, such as the quotient of division. A general register set 18 is comprised of 16 general registers GR0 to GR15 each being constructed by 32 bits. These registers are used as operation registers (accumulators) or data registers, and the registers GR9 to GR15 are also used as index registers. A floating point register set (FR) 46, consisting of eight registers FR0 to FR7, is used to perform floating point operations. A program status word (PSW) register 19 of 32 bits holds program execution status data (inhibition/allowance of program), or data representing the status of flag and input/output units. The program status word register 19 includes a status field, a condition code field and the like. A location counter (LOC) 20 holds the execution address of a program and, when the execution of an instruction ends, holds the address of the instruction to be next executed, except for JUMP, SKIP, BRANCH instructions and the like. The instruction register (IR) 21 holds the instruction fetched from MMU 14. The instruction buffer register (IB) 22 effects a buffer operation when the instruction from MMU 14 is loaded into the instruction register (IR) 21. A memory address register 23 of 24 bits holds a memory address used when MMU 14 is accessed. A memory data register (MDR) 24 of 32 bits stores the data to be written into or data read out from MMU 14. A base address register (BR) 25 is a register used for base address modification, and includes eight base registers BR0 to BR7. A working register (WR) 26 temporarily stores the data used in a microprogram.

The destination bus (D-bus) 35 carries the contents of the various registers to ALU 16.

A read only memory (ROM) 28 stores microprograms, sometime referred to as firmware, to control the above mentioned registers or other units. A microprogram control unit 29 is used to control the execution of the microprogram instruction stored in IR 21. The control unit 29 is composed of a ROM address register control and a ROM data address register control for latching data (both the controls are not shown).

A stack control register (SCR) 30, composed of four registers as described below, controls the stack area in MMU 14.

Figure 2:
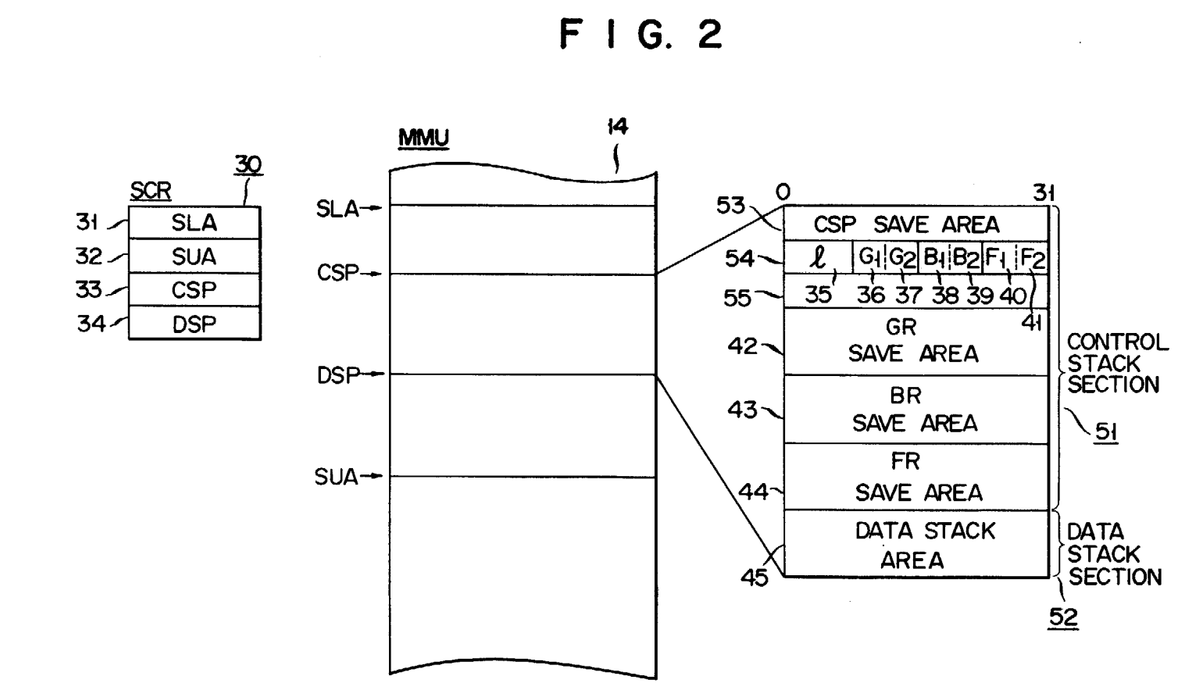
FIG. 2 shows a schematic illustration of a stack structure.

Stack Structure (FIG. 2)

A stack structure essential to the invention will be described with reference to FIG. 2.

In FIG. 2, SCR 30 is comprised of a stack lower address register (SLA) 31 for storing address data representing the lower limit of the stack area, a stack upper address register (SUA) 32 for storing address data representing the upper limit of the stack area, a control stack pointer register (CSP) 33 for storing address data representing the start address of a control stack and a data stack pointer register (DSP) 34 for storing address data representing the start address of a data stack.

A control stack area in main memory unit 114 is divided into a control stack section 51 and a data stack section 52.

Figure 3A:
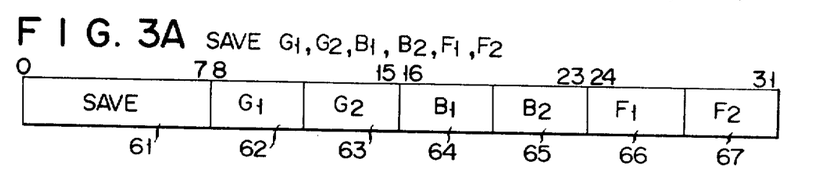
FIGS. 3A–3G show formats of the stack instructions to control the stack structure shown in FIG. 2.

The control stack section 51 is comprised of a control stack pointer save area 53, an area 54 for saving the size of the control stack section and general register numbers, an auxiliary data save area 55, a general register save area 42, a base register save area 43, and a floating point register save area 44. The contents of the control stack pointer register 33 when a SAVE instruction (to be described later) are executed, is stored in the control stack pointer storing area 53. The control stack size and register number save area 54 saves the sum of the sizes of the auxiliary data storing area 55 to be described later, general register save area 42, base register save area 43, and floating point register save area 44. Save areas 36 and 37 for saving general register numbers G1 and G2, save areas 38 and 39 for saving base register numbers B1 and B2, and save areas 40 and 41 for saving floating point register numbers F1 and F2 each save the first and last numbers of the register numbers desired to be saved. The further details of this will be described later relating to the SAVE instruction shown in FIG. 3. The auxiliary data save area 55 saves data such as the program status word and the like. For example, the program status word is stored in the auxiliary data save area 55 (inaccessible by a user) when a supervisor mode is designated by the mode designation field in the program status word. The general register save area 42 saves the entire contents of the general registers specified by the general register number pair G1 and G2 saved in areas 36 and 37. Similarly, the base register save area 43 and the floating point register save area 44 save the entire contents of base registers and floating point registers specified by the register pairs B1, B2 and F1, F2 saved in areas 38, 39 and 40, 41, respectively.

The data stack section 52 is an area which is set up, when a user program needs a working area, by a GET STACK instruction to be described later.

Formats of Control Instructions (FIGS. 3A to 3G)

Figure 3B:
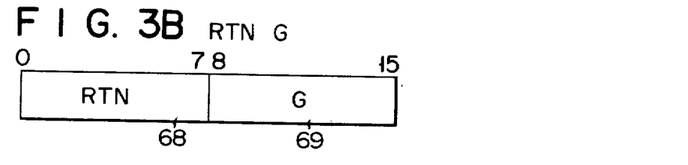

The formats of control instructions used in the stack structure will be elaborated with reference to FIGS. 3A to 3B. The instructions to be given are all used in subroutines.

A SAVE instruction shown in FIG. 3A saves general registers (GR0 to GR15), base registers (BR0 to BR7) and floating point registers (FR0 to FR7). The SAVE instruction may include 32 bits, for example. In the instruction, bits 0 to 7 designate an operation code (OP code) 61; bits 8 to 15 designate general register numbers 62 and 63 to be saved; bits 16 to 23 designate base register numbers 64 and 65 to be saved; and bits 24 to 31 designate floating point register numbers 66 and 67 to be saved.

The manner of designating the registers to be saved by using the SAVE instruction will be given. If the general register 60 is designated by the general register designation field 36 and the general register G5 by the general register designation field 37, G0, G1, G2, G3, G4 and G5 are stored in the general register save area (GR SAVE AREA) 42 in the data stack section. When the general register G15 is designated by the general register designation field 36 and the general register G3 by the general register designation field 37, the respective general register numbers G15, G0, G1, G2 and G3 are saved in the general register save area 42. In a case where no designation is needed of the general register, the general register designation fields 36 and 37 designate 0 and 0, respectively. The designation operation described above for the general registers is correspondingly applicable for designating base registers and floating point register data to be saved. Incidentally, a general register for storing the return address of the subroutine is included in the general registers specified by the SAVE instruction. This general register is specified by a subroutine call instruction used in a main program. The operation of the main program will be given with reference to detail in FIG. 4.

A LOAD AND RETURN instruction, shown in FIG. 3B, has a format of 16 bits. In the format, an operation code 68 is assigned to the field from bit 0 to 7; an operand 69 is assigned to the field from bits 8 to 15. Program branching takes place in dependence on the contents of the general register specified by the operand 69. The general register specified by the LOAD AND RETURN instruction is the general register specified as a parameter of the subroutine call instruction specified by the main program.

Figure 3C:
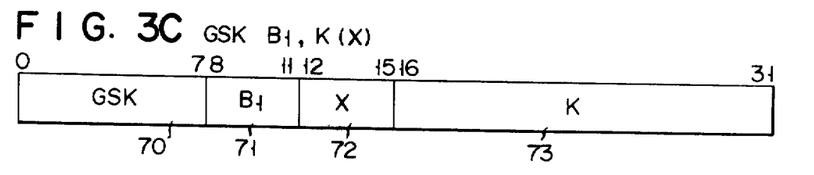

A GET STACK instruction, shown in FIG. 3C, has a format of 32 bits. An operation code 70 occupies the field from bits 0 to 7. A base register designation field 71 for saving the contents of DSP is included from bits 8 to 11. Bits 12 to 15 are assigned to an index register (X) (GR9 to GR15) designation field 72 to modify an index address. Bits 16 to 31 are assigned to a displacement operand 73 to designate the size (K) of a working area. The GET STACK instruction is used to establish the data stack area 52 shown in FIG. 2, that is to say, to set up a work area of the size defined by K+X (where X is not necessarily needed, i.e., may be zero).

Figure 3D:
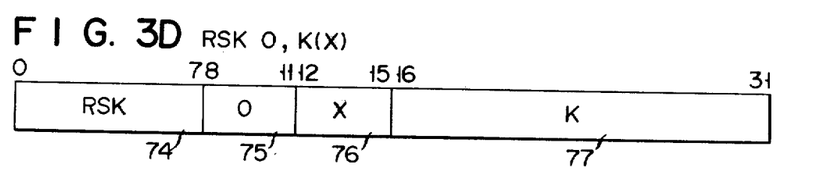

A RELEASE STACK instruction, shown in FIG. 3D, has a format of 32 bits. An operation code 74 is inserted between bits 0 to 7. An index register (X) (GR9 to GR15) designation field 76 is assigned to bits 12 and 15. Bits 16 to 31 provide a displacement field (K) 77 to designate the size of the work area to be released. Bits 8 to 11 are assigned to an empty or unused field 75. The RELEASE STACK instruction which is used corresponding to the GSK instruction, restores a part of or the entire work area obtained by the GSK instruction. The instruction also releases the work area defined by K+X (X is not always specified). The size K+X of the work area specified by the RSK instruction is not necessarily equal to that K+X specified by the GSK instruction, but must be smaller than the latter.

Figure 3E:
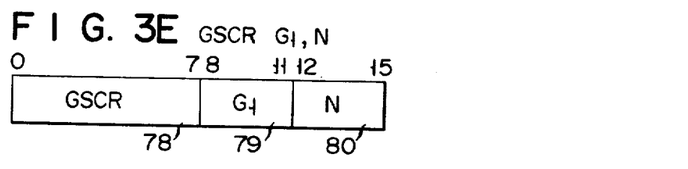

A GET STACK CONTROL REGISTER (GSCR) instruction, shown in FIG. 3E, has a format of 16 bits. In the format, an operation code 78 is assigned to bits 0 to 7; a general register (one of general registers GR0 to GR15) designation field 79 is assigned to bits 8 to 11. The remaining bits 12 to 15 are used by the stack control register (SLA 31 for N=0, SUA 32 for N=1, CSP 33 for N=2, DSP 34 for N=3) designation field 80. When the GET STACK CONTROL REGISTER instruction is executed, the contents of the stack control register 30 are loaded into the general register specified. Accordingly, when it is desired to refer to the contents of the stack control register (SLA 31, SUA 32, CSP 33, DSP 34), the contents of the desired register in SCR 30 and the general register for storing the contents of the selected register are specified by this instruction. In this manner, a user can refer to the contents of SCR 30 through the general register.

Figure 3F:
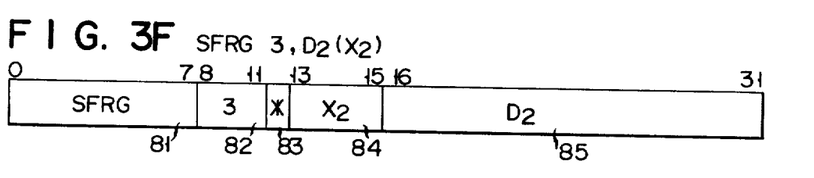

A privileged instruction, FIG. 3F, is used to load the contents of the stack control register (in this case, all the registers SLA, SUA, CSP and DSP are included) in a specified memory location. Here, the privileged instruction means an instruction which is used in the operating system and executed with priority to other instructions. In the format, bits 0 to 7 are provided for an operation code 81; bits 8 to 11 for an operation auxiliary data designation field 82; a bit 12 is used for an address modification judging field; bits 13 to 15 provide an index register designation field 84; and bits 16 to 31 are assigned to a displacement value 85. The operation auxiliary data 82 supports the operation code 81. For example, when this field designates 3, data is transferred from the control register to the memory. When 11 is designated, data is transferred from the memory to the control register. Upon the execution of this instruction, the contents of the stack control register 30 is loaded into the contents (D2+X2) of the memory specified by the displacement field 85 and the index address field 84.

Figure 3G:
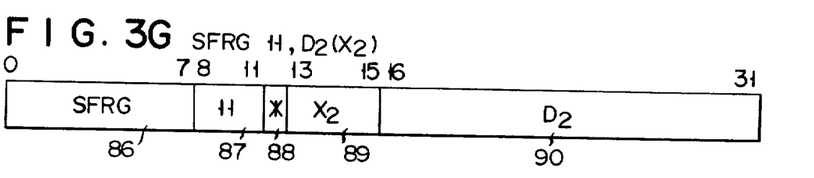

The instruction inverse to the instruction shown in FIG. 3F is shown in FIG. 3G. The format of this instruction is similar to that of the FIG. 3F instruction, except that the operation auxiliary data field 87 is 11. The contents of the address (D2+X2) of the memory specified by the displacement field 90 and the index address modification field 89 is loaded into the stack control register 30.

Use and Operation of Control Instructions (FIGS. 4 to 8)

The explanation to follow is how to use the above-mentioned instructions and the operations of them.

Figure 4:
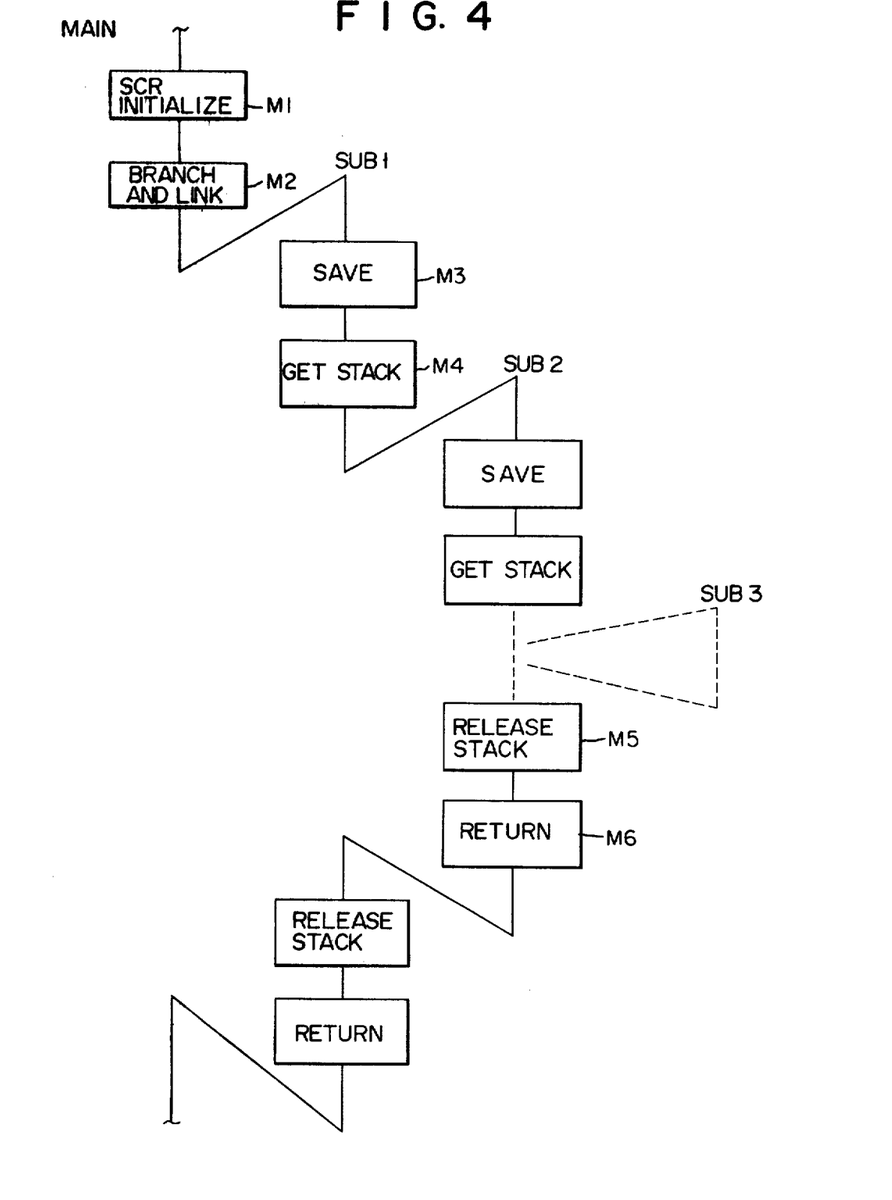
FIG. 4 is a flow diagram illustrating the operation flow when the instruction in FIG. 3 is used in the program.

Firstly, an initial value of the stack control register 30 is set by using the main program, as shown in step M1 of FIG. 4. For example, when a stack area 30 is formed in the memory MMY from the address 1OOO (hexadecimal) to 1FFF (hexadecimal), the stack control register 30 is set as follows;

SLA 31—address 1OOO (hexadecimal)
SUA 32—address 1FFF (hexadecimal)
CSP 33—address 1OOO (hexadecimal)
DSP 34—address 1OOO (hexadecimal)

The BAL (BRANCH AND LINK) instruction M2 causes the program to jump to a first subroutine SUB 1. Upon the execution of the BAL instruction, the return address of SUB 1 is stored in the general register specified by the BAL instruction. This is carried out by the microprogram. In the subroutine SUB 1, the SAVE instruction M3 is performed at the program entrance.

Figure 5:
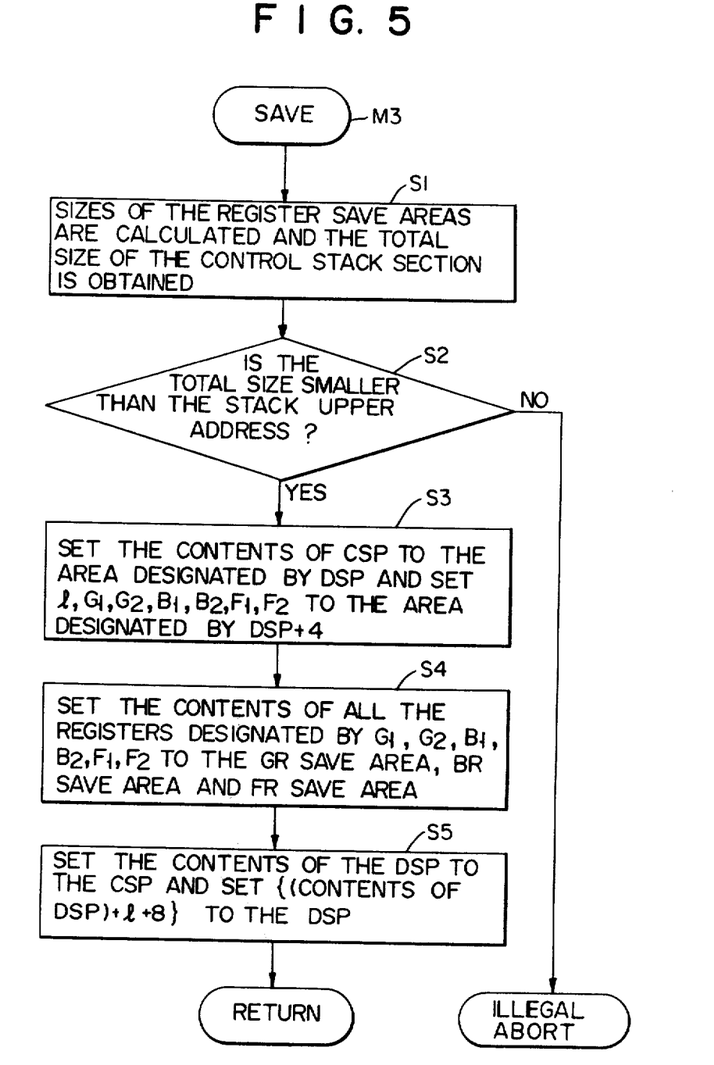
FIG. 5 is a flow chart illustrating the operation of a SAVE instruction.

Upon the execution of the SAVE instruction, the area of the control stack section 51 is calculated in step 51 depending on the number of the registers to be saved, as shown in the operation flow chart in FIG. 5. As shown in FIG. 3A, the numbers of general registers, base registers and floating point registers are known from the parameter given by the SAVE instruction, as shown in FIG. 3A. The memory location of the general register save area 42, the base register save area 43, and the floating point register save area 44 can be calculated from these numbers.

The control stack pointer save area 53, the control stack section, and the register number save area 54 are of the fixed type. In this example, the sizes of these are each 8 bytes. Therefore, the total size of the control stack section can be calculated. In the calculation, if there is data to be stored in the auxiliary data save area 55, the number of bytes corresponding to the data is additionally involved. An overflow check is performed in step 52 (FIG. 5) as follows. In step 52 a check is made as to whether the total size of the control stack section 51 exceeds the upper address (SUA) or not. If it exceeds SUA, an error has occurred and the program exits step M3 via the NO branch so that the program is interrupted or aborted to proceed to an error processing routine. On the other hand, if it does not exceed SUA, the YES branch from S2 is taken and the contents of the control stack pointer 33 are loaded in step S3 into the address (CSP SAVE AREA 53) designated by DSP 34. Additionally, the control stack sizes 1, G1 36, G2 37, B1 38, B2 39, F1 40 and F2 41 are loaded into the address (control stack size and register number save area 54) designated by DSP+4. Then, in step S4 the contents of the respective registers (general registers, base registers, floating point registers) designated by G1, G2, B1, B2, F1 and F2 are loaded into the respective register save areas 42, 43 and 44.

The next step S5 updates the data stack pointer 34 and the control stack pointer 33. In this step, the contents of the DSP 34 is set in CSP 33. The address of CSP 33, the contents of CSP SAVE AREA 53 and the size (8 bytes)

of the control stack and register number save area 54 are summed, and further the sizes of the auxiliary data storing area 55 and the respective register save areas 42 to 44 are summed. These sums are used as a new value of DSP 34. At this time, CSP indicates the address 1000 (hexadecimal) and DSP indicates the start address. At this stage, the registers specified by the SAVE instruction have all been stored in the stack control section and the program executes a return to subroutine 1, where the Get Stack instruction M4 is initiated.

Figure 7:
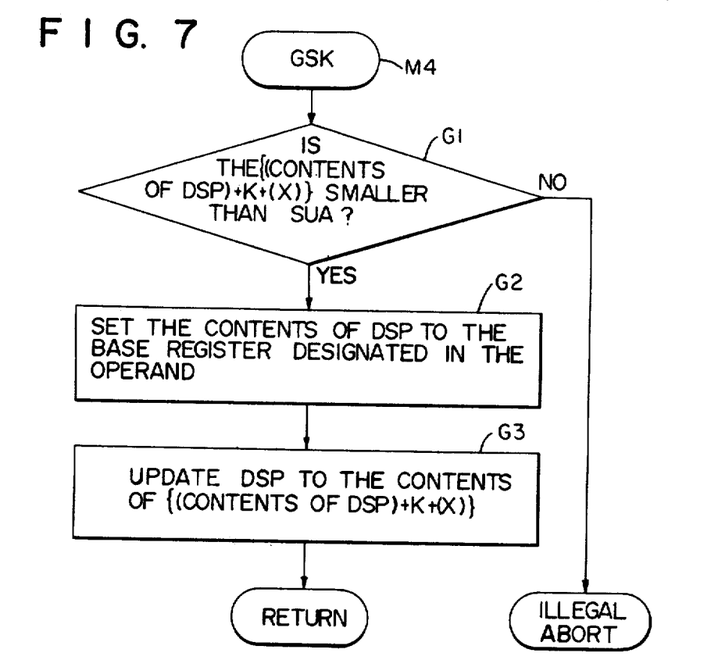
FIG. 7 is a flow chart illustrating the operation of a GSK instruction.

When the GSK instruction M4 is executed, it is first checked in step G1 as to whether the size of the work area specified by the GSK instruction is permissible or not, as shown in FIG. 7. In other words, it is checked to see whether the sum of the data stack pointer, the address K specified by the displacement of the GSK instruction and the address specified by the index modification field (X) is smaller than the upper address (SUA) of the stack. If the former is larger than the latter, it is illegal and thus the program exits step G1 via the NO branch and an interrupt is serviced to abort the program execution to proceed to the error processing routine. On the other hand, if that sum is within the upper address range, the program proceeds to step G2 where the contents of the data stack pointer are loaded into the base register specified by the base register designation field 71 of the operand. Then, in step G3, the contents of the data stack pointer are updated to the sum of the contents of the data stack pointer, the address designated by the displacement (K) 73 of the operand and the address specified by the index address modification field 72. The result is that the work area (K3X) is defined.

If the subroutine SUB 2 is called in the subroutine SUB 1, the SAVE instruction is executed again at the entrance of the SUB 2, as shown in FIG. 4. In a subroutine 2, if the work area must be defined, the GET STACK instruction is executed. Then, if a subroutine SUB 3 is further called in the subroutine 2, the SAVE instruction is similarly re-executed at the entrance of the subroutine SUB 3. If necessary, the GET STACK instruction is also re-executed.

Figure 8:
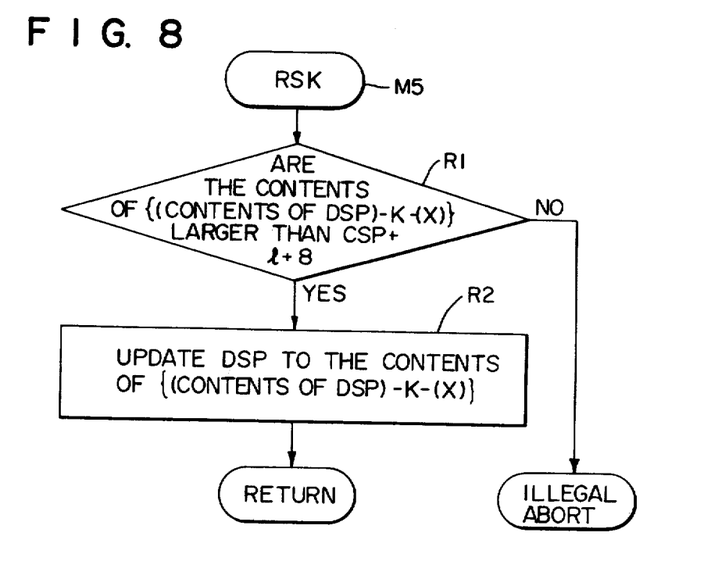
FIG. 8 is a flow chart illustrating a RSK instruction.

In a case where the working area has been defined, the RELEASE STACK instruction M5 (RSK) is performed to restore the stack region obtained before the return is executed. When the RSK instruction is executed, step R1 is performed to check for underflow as shown in FIG. 8. Specifically, GSP+1+8 is compared with the result of the subtraction of the address K specified by the displacement 77 and the address specified by the index address modification field 76. If the former is larger than the latter, it is illegal so that step R1 is exited via the NO branch and an interrupt is serviced and the program is aborted to proceed to the error processing routine. In the inverse case, the program proceeds to step R2 and the result of the subtraction of the size specified by the RSK instruction from the present contents of DSP is used as the new contents of DSP.

Figure 6:
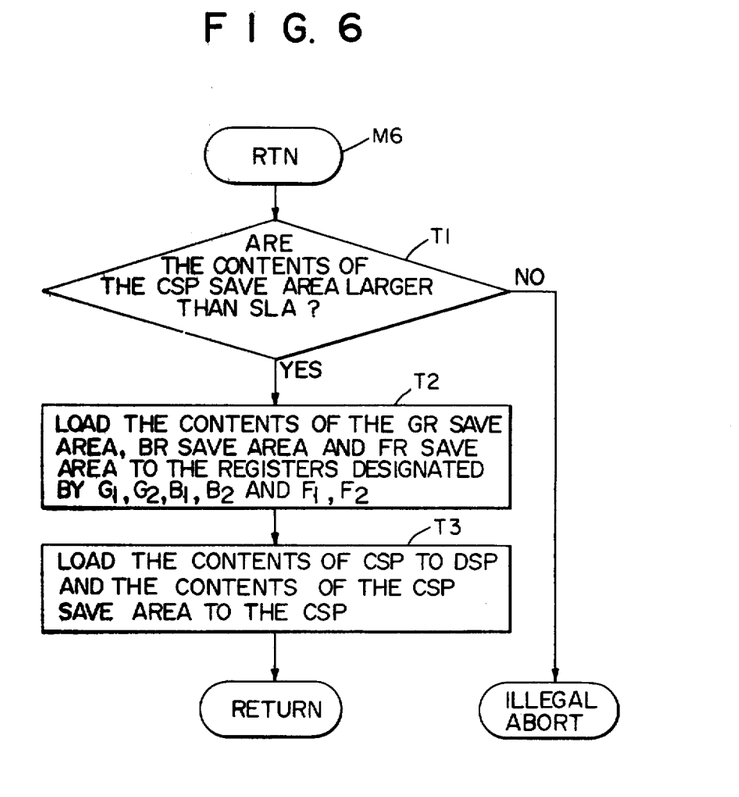
FIG. 6 is a flow chart illustrating the operation of a RTN instruction.

After RELEASE STACK terminates, the RTN instruction M6, is executed as shown in FIG. 6. When this instruction is executed, the contents of the control stack pointer are compared in step T1 with the lower limit address of the stack area. As a result of the comparison, if the former is smaller than the latter, it is illegal so that step T1 is exited via the NO branch and the operation is interrupted to jump to the error processing routine. Conversely, if the former is larger than the latter, the contents of the general register save area, the base register save area, the floating point register save area are loaded in step T2 into the registers specified by G1 36, G2 37, B1 38, B2 39 and F1 40 and F2 41 which are designated by the SAVE instruction. Following this, CSP 33 and DSP 34 are updated in step T3. That is to say, the present contents of CSP 33 are set in DSP 34 and the contents of the CSP save area 53 are set in CSP 33. In this manner, the processing shifts from the subroutine SUB 2 back to the subroutine SUB 1, as shown in FIG. 4. In the subroutine SUB 1, the RSK instruction is executed again and the RTN instruction is executed to return to the main program.

Effects and Modification

As described above, the data processor according to the invention can effect stack processing in a simple and inexpensive way, and enhance the effectiveness of programs using the stack arrangement, that is to say, it enables more efficient implementation of recursive or reentrant programs. Accordingly, it can realize a computer system with a high efficiency. Additionally, the stack structure assumes the processing of the save/restore of operation for various registers which takes place in program branching, and the processing of the obtainment/release of the working area which takes place in the data processing operations of various programs. For this reason, a data processor employing the invention can process data at a high speed and with reduced overhead within the software system.

In application, the invention is not limited to a minicomputer, although the invention has been described relating to it, but is applicable for medium- and large-size computers and microcomputers as well. In the case of the minicomputer or microcomputer, about the same effect may also be expected when the stack control register is assigned to a part of the general register set or a memory.

The address counter for the control stack area, which is included in the memory in the above example, is not essential but may be replaced by another register.

What we claim is:

1. In a computer system having a memory unit, arithmetic logic (ALU) unit, working registers, a stack control register, and means for executing control instructions associated with said programs, a method of controlling the storage of linkage data at the time control of said system is shifted from a calling program to a called program comprising the steps of:
    initializing said stack control register in response to a control instruction by entering the same predetermined address value into a control stack pointer (CSP) section and a data stack pointer (DSP) section of said register;
    loading the contents of said CSP section into said memory unit at the address specified by the contents of said DSP section to save a control stack pointer address at the time program control of said system shifts from said calling program to said called program;
    moving the contents of said DSP section into said CSP section;
    adding in said ALU a first address increment derived from a control instruction to the contents of said CSP section to determine an intermediate address defining an area in said memory unit for storing program status data pertaining to said calling program;
    adding in said ALU a second address increment derived from a control instruction to said intermediate address to determine an offset address defining a memory area for storing working data pertaining to said called program; and entering said offset address into said DSP section to establish an address pointer for the entry of the next control stack pointer address to be saved.

2. The method set forth in claim 1 wherein a first control instruction controls said loading and moving steps and a second control instruction controls said step of entering.

3. The method set forth in claim 2 wherein said first control instruction includes first control data defining the size of said memory area for storing said program status data and said second control instruction includes second control data defining the size of said memory area for storing said working data, said first and second address increments being derived from said first and second control data, respectively.

4. The method set forth in claim 3 comprising the further steps of:

entering said intermediate address into said DSP section during execution of said first control instruction; and performing said second adding step during execution of said second control instruction by summing the contents of said DSP section with said second address increment.

5. The method set forth in claim 1 wherein said step of loading comprises the steps of:

loading register identification data supplied by a control instruction into said memory unit at a first address derived from the contents of said DSP section to save said register identification data; and loading the contents of a working register specified by said register identification data into said memory unit at a second address derived from the contents of said DSP section to save the contents of said register.

6. The method set forth in claim 4 comprising the further step of:

transferring said intermediate address into a working register specified by said second control instruction to provide to said called program an address pointer designating the area of said memory unit for storing said working data.

7. The method set forth in claim 6 wherein said step of transferring is controlled by said second control instruction and is performed by moving the contents of said DSP section into said specified working register prior to the addition of said second address increment to the contents of said DSP section.

8. The method set forth in claim 1 comprising the further steps of:

subtracting said second address increment from the contents of said DSP section to determine a releasing address at the time the program control of said system shifts from said called program back to said calling program; and entering said releasing address into said DSP section of said stack control register to release said working data area of said memory.

9. The method set forth in claim 8 comprising the further steps of:

loading into a selected working register program status data stored in said memory unit at an address derived from the contents of said CSP section to recondition said system for control by said calling program;

moving the contents of said CSP section into said DSP section; and entering a saved control stack pointer address into said CSP section from the location in said memory unit specified by the contents of said DSP section to establish an address pointer for accessing said memory unit to load into said working register additional previously saved program status data when program control of said system shifts from said calling program back to a preceding calling program.

10. In a computer system having a memory unit, arithmetic logic unit (ALU), working registers, data transfer means for transferring data between the elements of said system, and means for executing control instructions, apparatus for controlling the storage of linking data at the time control is shifted from a calling program to a called program, comprising:

a stack control register having a control stack pointer (CSP) section and a data stack pointer (DSP) section;

first control means for controlling said data transfer means to initialize said stack control register by entering the same predetermined address value into said CSP and DSP sections of said stack control register;

second control means for controlling said data transfer means to load the contents of said CSP section into said memory unit at the address specified by the contents of said DSP section to save a control stack pointer address at the time program control of said system shifts from said calling program to said called program;

third control means for controlling said data transfer means to move the contents of said DSP section into said CSP section;

fourth control means for controlling said ALU to add a first address increment derived from a control instruction to the contents of said CSP section to determine an intermediate address defining an area in said memory unit for storing program status data pertaining to said calling program;

fifth control means for controlling said ALU to add a second address increment derived from a control instruction to said intermediate address to determine an offset address defining a memory area for storing working data pertaining to said called program; and sixth control means for controlling said data transfer means to enter said offset address into said DSP section to establish an address pointer for the entry of the next control stack pointer address to be saved.

11. The apparatus set forth in claim 10 wherein said second and third control means operate in response to a first control instruction and said sixth control means operates in response to a second control instruction.

12. The apparatus set forth in claim 11 wherein said first control instruction includes first control data defining the size of said memory area for storing said program status data and said second control instruction includes second control data defining the size of said memory area for storing said working data, said first and second address increments being derived from said first and second control data, respectively.

13. The apparatus set forth in claim 12 further comprising:

seventh control means for controlling said data transfer means to enter said intermediate address into said DSP section during execution of said first control instruction; and means included in said fifth control means for executing said second add operation during execution of said second control instruction by summing the contents of said DSP section with said second address increment.

14. The apparatus set forth in claim 10 wherein said second control means comprises:

means for controlling said data transfer means to load register identification data supplied by a control instruction into said memory unit at a first address derived from the contents of said DSP section to save said register identification data; and means for controlling said data transfer means to load the contents of a working register specified by said register identification data into said memory unit at a second address derived from the contents of said DSP section to save the contents of said register.

15. The apparatus set forth in claim 13 further comprising:

eighth control means for controlling said data transfer means to transfer said intermediate address into a working register specified by said second control instruction to provide to said called program an address pointer designating the area of said memory unit for storing said working data.

16. The apparatus set forth in claim 15 wherein said eighth control means is controlled by said second control instruction and operates to move the contents of said DSP section into said specified working register prior to the operation of said fifth control means.

17. The apparatus set forth in claim 10 further comprising:

means for controlling said ALU to subtract said second address increment from the contents of said DSP section to determine a releasing address at the time the program control of said system shifts from said called program back to said calling program; and means for controlling said data transfer means to enter said releasing address into said DSP section of said stack control register to release said working data area of said memory.

18. The apparatus set forth in claim 17 further comprising:

means for controlling said data transfer means to load into a selected working register program status data stored in said memory unit at an address derived from the contents of said CSP section to recondition said system for control by said calling program;

means for controlling said data transfer means to move the contents of said CSP section into said DSP section; and means for controlling said data transfer means to enter a saved control stack pointer address into said CSP section from the location in said memory unit specified by the contents of said DSP section to establish an address pointer for accessing said memory unit to load into said working register additional previously saved program status data when program control of said system shifts from said calling program back to a preceding calling program.

* * * * *